United States Patent Office 3,453,035
Patented July 1, 1969

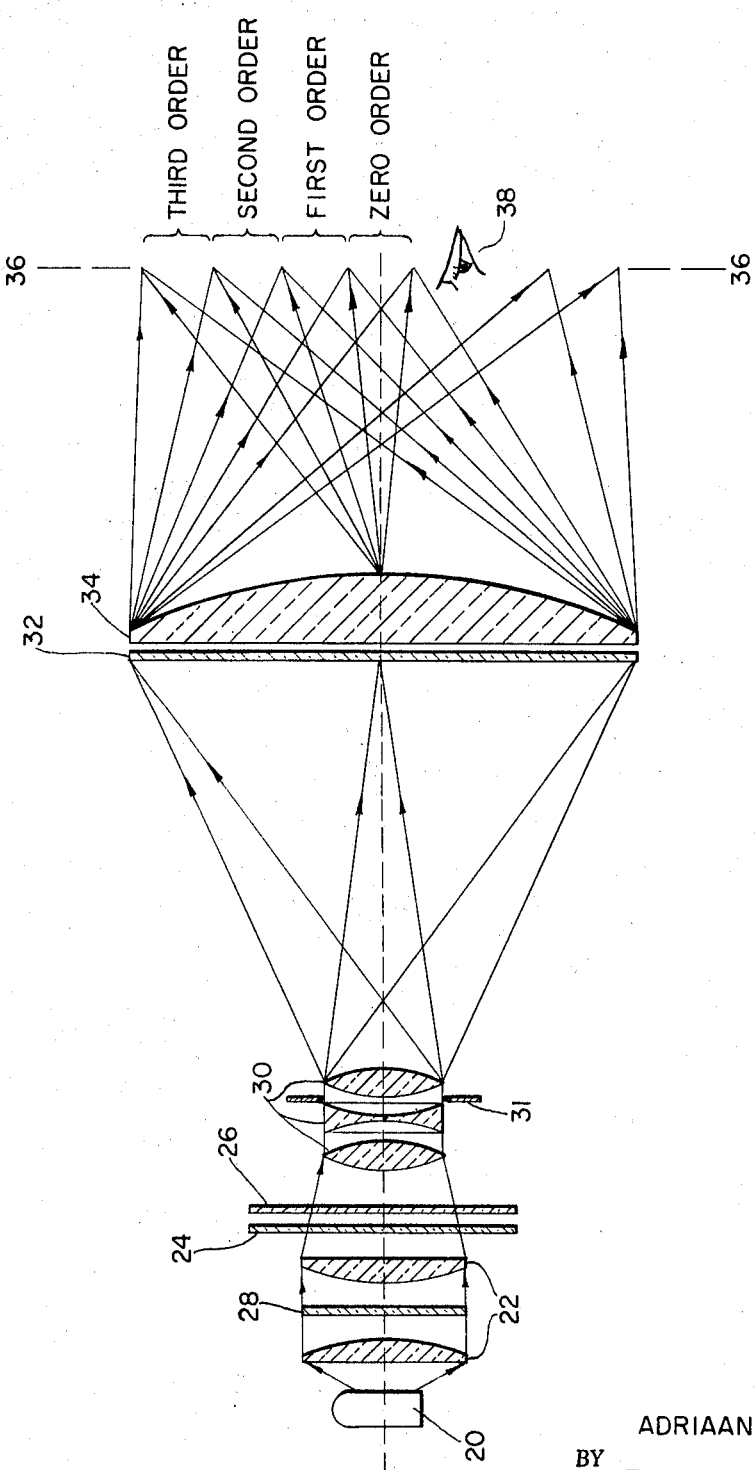

3,453,035
OPTICAL SYSTEM WITH DIFFRACTION GRATING SCREEN
Adriaan Walther, Acton, Mass., assignor, by mesne assignments, of one-half each to Diffraction Limited, Inc., Bedford, Mass, a corporation of Delaware, and Mark Systems, Inc., Los Altos, Calif., a corporation of California
Filed Nov. 4, 1963, Ser. No. 320,981
Int. Cl. G02b 21/00, 27/38
U.S. Cl. 350—9                                      10 Claims

ABSTRACT OF THE DISCLOSURE

An optical viewer in which a diffraction grating is disposed at the image plane of a real image formed by a magnifying lens, and a field lens, adjacent the grating, then images light from the grating to create an array of exit pupils formed as successive diffraction orders, thereby providing the effect of a greatly enlarged exit pupil for the system.

---

This invention relates to optical devices and, more particularly, to devices in which the effective exit pupil is expanded.

In using a viewing microscope type of optical instrument, particularly as an aid in industrial production and for like purposes, the user or viewer is required to peer through the instrument for protracted periods. If also the exit pupil is very small, as is typically the case with a microscope, the viewer's head movements become markedly constrained by the requirement that the exit pupil and viewer's eye coincide.

It is, therefore, desirable to provide an optical instrument of this type which exhibits, for example, magnification of 20× to 50×, resolving power in the order of 400 lines/mm. in the object at greatest magnification, a field of view of not less than about 3" square at the object side at the smallest magnification, and in addition provides an exit pupil which is large enough to permit a certain amount of head movement.

An optical system containing only refractive and reflective elements cannot satisfy these exemplary requirements. For instance, in a microscope-type instrument wherein the image is projected at infinity, the magnification M is (1) $$M = 10/f$$

where $f$ is the focal length, in inches, of the system. The diameter $d$ of the exit pupil is given by the product of three factors: twice the focal length, the sine of the semi-aperture angle $\mu$ in the object space, and the refractive index $n$ of the object space, i.e.

(2) $$d = 2fn \sin \mu$$

This formula follows from Abbe's sine law. Combining Equations 1 and 2 to eliminate $f$, then provides (3) $$dM/20 = n \sin \mu$$

which clearly shows that the larger the magnification, the smaller is the exit pupil. Thus, for a 50× magnification, the largest theoretical exit pupil is about 0.4″ even with an optical system having a numerical aperture of 0.5 (i.e., an F number of 1). The value that can be attained in practice would probably not be more than one-half as large.

With respect to an optical instrument wherein the image is projected into a plane at a nominal viewing distance, for example of 10″, in front of an observer, the foregoing discussion is also applicable. In spite of the difference in geometry of the two instruments, Abbe's sine law leads in both instances to Formula 3 with the same conclusion. In either case, to obtain an exit pupil large enough such that reasonable head movements of a viewer are permissible, or the image is to be viewed with both eyes, e.g., an exit pupil of about 3½″ in diameter, in theory limits the maximum magnification obtainable to 5.7×. Practical problems reduce this to about 4.5×.

The present invention therefore has as its principal object the provision of an optical magnication system providing an apparent exit pupil of a size sufficient to permit comfortable continuous viewing by an observer at magnifications heretofore unattainable and with acceptable resolving power. To achieve this, the present invention incorporates at the real image plane of the objective of the system, diffraction means such as at least one transmission grating and an adjacent field lens means which together provide an array of exit pupils so aligned as to constitute an apparent single composite exit pupil of a magnitude considerably greater than the exit pupil provided by the system without the diffraction means.

Other objects of the invention will in part be obvious and will in part appear hereinafter. The invention, accordingly, comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawing wherein there will be seen a schematic diagram of an optical viewing system incorporating one embodiment of the present invention.

As shown, the system includes means such as light source 20, for providing the requisite radiation to form the image to be observed. Means, such as condenser 22, are included for directing light from source 20 through a diffuser, such as opal glass sheet 24, to target or object 26, the diffuser providing a substantially homogeneous light distribution upon object 26. The latter, which may obviously be viewed either by transmission or reflection, is shown as positioned for transmission viewing. It is preferred that radiation directed upon target 26 be substantially monochromatic. Hence, radiation from source 20 can be coherent as from a laser, the radiation being rendered incoherent but still substantially monochromatic by the scattering effect of sheet 24. In the event radiation from source 20 is comparatively wide-band, there is preferably associated with condenser 22, means such as interference filter 28, which will serve to narrow the frequency band of radiation directed to the target.

The system includes objective lens means 30, such as a typical enlarging lens system for magnifying and imaging the target and also, in the embodiment shown, serving to define the entrance pupil. In the preferred embodiment the entrance pupil is rectangular, a square shape being the more desirable. This, of course, can be accomplished by providing a lens which is square, as distinguished from circular about its optical axis, or more practically by providing an appropriately shaped iris or stop 31 for the lens. The iris may be fixed or variable as desired. Objective lens means 30 and target 26 are so disposed relative to one another that the target lies in an object plane which includes one of the conjugate foci of the objective lens means.

Located at the image surface or plane of lens means 30 is diffraction screen means such as diffraction grating 32. The latter, in the form shown, is a plane transmission grating, but it will be apparent to those skilled in the art that with simple modifications of the system geometry, reflection gratings may also be employed. Preferably, grating 32 is a phase grating.

It is important that the plane of the grating be congruent with the image surface, i.e., lie within the plane of the image formed by the objective lens means and, of course, across the optical axis of the latter. It will be apparent to those skilled in the art that this is not difficult to achieve in practice; a typical grating thickness is several orders of magnitude less than the depth of focus at the image plane provided by a typical objective lens, for example, of about 1″ or 2″ diameter and having an F number around 1. Consequently, it is relatively simple in such case to provide the requisite accuracy of focus of the real image onto the grating plane.

Located adjacent the grating plane and across the optic axis of the objective lens means is means, such as field lens 34, for forming an exit pupil from light provided by the objective lens means. In the form shown, field lens 34 is a plano-convex lens positioned such that the grating lies between lenses 34 and 30. Lens 34 is not to be considered as being so limited, but can be a biconvex lens, simple or compound, and can be positioned on either side of the grating with respect to lens 30. However, it is preferred that field lens 34 be disposed very closely to the real image plane of lens 30. Thus, if S is the distance of the real image plane of lens 30 from lens 34 (and therefore the distance from lens 34 to its object), S' is the distance from lens 34 to the image formed by it, and $f'$ is the focal length of lens 34 then (4) $$\frac{1}{S}+\frac{1}{S'}=\frac{1}{f'}$$

and (5) $$-\frac{S'}{S}=\frac{1}{1-S/f'}$$

Inasmuch as $$-\frac{S'}{S}=\beta$$

or the magnification of the lens, it will be seen that if S is very small (close to the real image formed by lens 30) and $f'$ is comparatively large in relation thereto, then the field lens does not serve to magnify or move the real image formed by lens 30, but is only intended to refract light from the objective so as to form an exit pupil wherein the largest range of object can be viewed.

Without a grating adjacent thereto, lens 34 would provide the usual exit pupil as heretofore defined in Equation 2. However, in the present invention the diffraction effect of the grating combined with the imaging function of the field lens provides an array of exit pupils.

If the grating is a linear grating comprising typically a multiplicity of parallel equidistant slits exhibiting maximum light transmissions and separated by minimum light transmitting elements, then the array of exit pupils is likewise linear and the line of the array of exit pupils as imaged to a plane by lens 34, lies perpendicular to both the optic axis of the system and the line of any of the slits. With two such gratings respectively having their slits normal to the optic axis of the system and to one another (or alternatively a single grating, ruled in two perpendicular directions in its own plane) a square composite exit pupil is created. The number of lines per unit distance in the simple parallel line grating is calculated by determining the diameter $d$ of one exit pupil required to form the desired linear array. If the desired array is to be formed from N diffraction images, N being an odd number consisting of the zero order image and a number representing pairs of other order images on each side of the zero order, then the Nth order image must be deviated by an angle subtending one-half of the array forming the composite exit pupil. Knowing the desired distance D from the exit pupil to the image (i.e., the plane of the grating) and the wavelength of the light, the grating period P can readily be calculated.

The grating described above provides a diffraction effect in which the energy transmission decreases as the image order increases. Diffraction gratings of known type can be employed so that the energy deflected by the grating in all or most of the lower image orders used will tend to be equal. However, as a practical matter as detailed hereinafter, the uniformity of energy from order to order is not necessary.

The operation of the system of the invention can most clearly be described in connection with certain exemplary parameters. As light source 20, an H 100 A38–4/T mercury arc lamp of the General Electric Company can be used. For test purposes, one can employ a Buckbee-Meers resolving power test target illuminated by light from source 20 passed through condenser 22 of two simple concave lenses, a known appropriate interference filter 28, and an opal glass sheet as diffuser 24. The target is imaged by objective lens means 30 (such as an Angenieux 1 inch F/0.95 lens stopped to provide a square iris) onto diffraction means 34 constituted as from a Bausch and Lomb Optical Company plane replica transmission grating ruled with a line frequency of 150 lines/mm. Field lens 34, typically of 10 inches in diameter and having a focal length of 10 inches, is placed closely adjacent the grating so that the square input pupil of the objective as deviated by the grating is imaged in the form of an array into the viewing plane 36 of a detector, such as the observer's eye 38.

With such an optical system, the target can be seen easily with both eyes at a viewing distance of about 10 inches from the field lens with enough freedom left to move the head in a horizontal direction over several inches.

The image is of excellent quality, a line frequency of 7 lines/mm. in the image plane being readily resolved by eye. The intensity of the zero order image will appear brighter than the others; the intensity drop when moving to observation of the first several of the higher orders presents no problem as no appreciable intensity difference between the two eyes can be readily recognized. Careful focusing is necessary because a slight defocusing causes the image to appear to jump when going from one pupil image to the next with one's eye. The lateral magnification is of the order of 10× to 12×.

It will be understood that it is preferred to adjust the dimension of the objective iris (i.e., the input pupil) so that the exit pupils will just abut one another. A detector or eye placed at plane 36 will then view the image and be focussed thereon. The exit pupil array, however, is then quite out of focus of the eye, and its composite character will be ignored much in the same manner as is dirt on a window through which one views a far field. The closeness with which the individual or elemental pupils abut one another contributes to this effect.

While the invention has herein been described in connection with planes, it will be appreciated that this is a simplification for the sake of clarity. Obviously in practice, as is well known, a certain amount of field curvature will be introduced by the lenses, and the term "plane" is intended to include surfaces thus curved. Also, all of the portions of a grating may not, in fact, lie in a single surface, but usually are all close enough so that they may nominally be so considered as being in the single surface. In particular, the field lens will tend to introduce an undesirable amount of curvature. However, a negative lens can be placed adjacent the object or target to provide a measure of control for field curvature introduced by the field lens. The term "light" as used herein is intended also to include other radiation which can be readily refracted and diffracted, for example infrared, ultraviolet, certain microwaves and the like; in such instances it will be understood that appropriate refracting, diffracting elements and detection means are to be employed as, respectively, the described lens means, diffraction means and the observer's eye.

Since certain changes may be made in the above apparatus without departing from the scope of the invention herein involved it is intended that all matter contained in the above description or shown in the accompanying drawing shall be interpreted in an illustrative and not in a limiting sense.

What is claimed is:

1. An optical system for use with a source of substantially monochromatic radiation and comprising,
   lens means for magnifying and forming, at an image surface a real image of an object in said radiation,
   a diffraction grating disposed substantially congruently with said image surface, and
   means for imaging radiation from the magnifying means so as to form, in cooperation with said diffraction grating, an array of exit pupils for said system formed as successive diffraction orders.

2. An optical system for use with a source of substantially monochromatic light, and comprising
   means for magnifying and imaging, at an image plane, a real image of an object in said light,
   diffraction grating means disposed substantially congruently with said image plane, and
   lens means disposed adjacent said grating means for imaging light from said magnifying means so as to form, in cooperation with said grating means, an array of exit pupils for said system formed as successive diffraction orders.

3. An optical system for use with a source of substantially monochromatic light, and comprising,
   objective lens means for magnifying and forming, at an image plane, a real image of an object in said light,
   a plane diffraction grating disposed substantially congruently with said image plane and across the optical axis of said objective lens means, and
   field lens having its optical axis substantially colinear with the optical axis of said objective lens means and being disposed closely adjacent said grating.

4. An optical system for use with a source of substantially monochromatic light, and comprising,
   objective lens means for magnifying and forming a real image of an object in said light,
   a diffraction grating having a grating surface positioned for having said real image substantially focused thereon, and field lens means disposed substantially normal to and across the optical axis of said objective lens means closely adjacent one side of said grating.

5. An optical system as defined in claim 4 including a source of substantially monochromatic light for illuminating said object.

6. An optical system as defined in claim 4 including means for defining a substantially rectangular entrance pupil for said system.

7. An optical system as defined in claim 4 wherein said grating is formed of a number of parallel alternately maximum and minimum light transmitting linear slits.

8. An optical system as defined in claim 4 wherein said grating is a phase grating.

9. An optical system as defined in claim 4 wherein said grating is formed of a first number of parallel alternately maximum and minimum light transmitting linear slits extending in a first direction substantially in a plane, and at least on other number of similar slits extending in another direction in said plane.

10. An optical system comprising,
    a light source,
    means for filtering light from said source so as to render said light substantially monochromatic,
    means for directing the filtered light toward an object,
    means for diffusing light directed toward said object to provide substantially uniform illumination of said object,
    objective lens means for forming at a focal plane thereof a real image of the illuminated object,
    stop means cooperating with said objective lens means for defining a rectangular entrance pupil,
    a plane diffraction grating having its grating surface substantially at said focal plane, and
    field lens means for imaging light from said entrance pupil and cooperating with said grating to provide a composite exit pupil constituted as an array of adjacent individual exit pupils formed as successive diffraction orders.

References Cited

UNITED STATES PATENTS

| | | | |
|---|---|---|---|
| 2,589,014 | 3/1952 | McLeod | 88—1.5 |
| 2,846,918 | 8/1958 | Miles | 88—1 |
| 2,891,444 | 6/1959 | Ewald | 88—29 |
| 2,977,847 | 4/1961 | Meyer-Arendt | 88—39 |
| 3,180,216 | 4/1965 | Osterberg | 88—39 |
| 3,195,432 | 7/1965 | Baluteau | 88—1 |

FOREIGN PATENTS

| | | |
|---|---|---|
| 1,196,772 | 5/1959 | France. |
| 1,263,557 | 5/1961 | France. |
| 800,303 | 7/1958 | Great Britain. |

DAVID SCHONBERG, *Primary Examiner.*

T. H. KUSMER, *Assistant Examiner.*

U.S. Cl. X.R.

350—162